(12) United States Patent
Takayama

(10) Patent No.: US 7,428,027 B2
(45) Date of Patent: Sep. 23, 2008

(54) OPTICAL SHEET, AND BACKLIGHT UNIT AND DISPLAY HAVING PLURAL MICROLENSES ON LENS SHEET WITH RESPECTIVE LIGHT TRANSMISSION PARTS AND PAIRS OF REFLECTION LAYERS SANDWICHING THE LIGHT TRANSMISSION PARTS

(75) Inventor: Hisashi Takayama, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 12/030,138

(22) Filed: Feb. 12, 2008

(65) Prior Publication Data

US 2008/0186713 A1 Aug. 7, 2008

Related U.S. Application Data

(63) Continuation of application No. PCT/JP2007/052132, filed on Feb. 7, 2007.

(51) Int. Cl.
*G02F 1/1335* (2006.01)

(52) U.S. Cl. ............... 349/95; 349/62; 349/64; 349/66; 362/561; 362/607; 362/616; 362/617

(58) Field of Classification Search ............. 349/62, 349/64, 66, 95; 362/561, 607, 616–620
See application file for complete search history.

(56) References Cited

U.S. PATENT DOCUMENTS

| 6,195,196 B1 * | 2/2001 | Kimura et al. ........... 359/295 |
| 6,421,103 B2 * | 7/2002 | Yamaguchi ............... 349/61 |
| 2005/0002204 A1 * | 1/2005 | Lin et al. ................ 362/551 |

FOREIGN PATENT DOCUMENTS

| JP | 2004-094051 | 3/2004 |
| JP | 2006-106197 | 4/2006 |
| JP | 2006-318886 | 11/2006 |

* cited by examiner

*Primary Examiner*—David C. Nelms
*Assistant Examiner*—John Heyman
(74) *Attorney, Agent, or Firm*—Squire, Sanders & Dempsey, L.L.P.

(57) ABSTRACT

One embodiment of the present invention is an optical sheet including a lens sheet having a plurality of microlenses arranged on a front surface thereof and a plurality of projections located at a back side thereof, a projection being located between light transmission parts, and a part corresponding to the microlens being the light transmission part; and a plurality of light reflection layers provided on top of the plurality of projections. A light refracted by the side surface of the projection exits in an oblique direction towards a plane of the optical sheet. Thereby, the view angle can be broadened.

10 Claims, 6 Drawing Sheets

(a)

(b)

OPTICAL SHEET, AND BACKLIGHT UNIT AND DISPLAY HAVING PLURAL MICROLENSES ON LENS SHEET WITH RESPECTIVE LIGHT TRANSMISSION PARTS AND PAIRS OF REFLECTION LAYERS SANDWICHING THE LIGHT TRANSMISSION PARTS

CROSS-REFERENCE TO RELATED APPLICATIONS

This is a Continuation Application of PCT Application No. PCT/JP07/052132, filed Feb. 7, 2007, which is incorporated herein by reference in its entirety.

(Claims in this application were allowed on Oct. 16, 2007 by Japan Patent Office)

BACKGROUND OF THE INVENTION

1. Field of the Invention

The present invention is related to a display apparatus where a light transmission and a light shading are controlled for every pixel to display an image, and a backlight unit and an optical sheet used for this display. An examples of such a display apparatus includes a liquid crystal display.

2. Description of the Related Art

A liquid crystal display apparatus using a transmission type liquid crystal panel has a backlight unit and a liquid crystal panel where pixels are arranged like dots. A character or an image can be displayed by controlling a light transmittance of each pixel. The following are types of backlight unit: the distribution of outgoing light is controlled by a combination of a halogen lamp, a reflection plate and a lens; and a cold-cathode tube is provided at an end surface of a light guiding body where a light emitted from a cold-cathode tube exits from a surface (a main surface) which is perpendicular to the end surface. The former is mainly used for a liquid crystal projector which needs high luminance. The latter is used for a display for a direct-view-type liquid crystal TV or a notebook computer since a display using the latter can be made thin. In a liquid crystal TV or a notebook computer, reduction of power consumption and high luminance are needed. High luminance can be realized by increasing the number of light sources such as a cold-cathode tube, however the increasing number of light sources contributes to the increase of power consumption. Therefore, it is not suitable for practical use.

An example such as this backlight unit is described as follows: as shown in FIG. 5, a light reflection plate is arranged in a back side of a light source, and an optical sheet which controls the range of the exiting light is placed. This optical sheet has a transparent substrate, a plurality of microlenses arranged on a surface in a liquid crystal panel side of this transparent substrate, light transmission parts provided at positions corresponding to the microlenses wherein the positions are in a surface of a light source side of this transparent substrate, a light reflection layer covering part of a transparent substrate surface in a light source side wherein the part is without this light transmission part, and a light scattering layer covering the light transmission part and the light reflection part. That is, at first, light emitted from a light source is diffused uniformly by the light scattering layer. An exiting light directed to the light transmission part of this diffused light is transmitted through this light transmission part. Next, the transmitted light is refracted by the microlens to be directed to a direction which is perpendicular to a surface of the optical sheet. Next, the refracted light exits from the optical sheet as a parallel light. In addition, the diffused light which is directed to a part except for the light transmission part is reflected by the light reflection plate or the light reflection layer. The reflection is repeated. Finally, the reflected light passes through the light transmission part, thereafter the light is refracted by the microlens. Then, the light exits from the optical sheet as a parallel light which is perpendicular to a surface of the optical sheet. In this way, all lights from a light source pass through the light transmission part and the microlens and exit from the optical sheet. Then, the light enters into a liquid crystal panel as a parallel light. Therefore, the utilization efficiency of light from a light source can be improved while the distribution of the light can be controlled, thereby a bright image display can be realized.

[patent document 1] JP-A-2006-106197

BRIEF SUMMARY OF THE INVENTION

The reason why the distribution of the outgoing light can be controlled by the optical sheet is described by referring to FIG. 6.

That is, in FIG. 6, a light having a largest incident angle θ among lights coming into a light transmission part 2 is a light which goes along a diagonal line of the light transmission part (that is, $x_4$ in FIG. 2.), wherein, in FIG. 6, refractive index of a light scattering layer 4 is $n_1$, a refractive index of a light transmission part 2 is $n_2$, a refractive index of a transparent substrate 103 is $n_3$, a thickness of a light reflection layer 3 is d, and an aperture width 101 of the light transmission part 2 is l. This light $x_5$ satisfies the following formulas (1) and (2) wherein φ is a refractive angle when the light $x_4$ comes into the light transmission part 2

$$n_1 \sin\theta = n_2 \sin\phi \qquad (1)$$

$$\tan\phi = l/d \qquad (2)$$

A light which has an incident angle less than θ (for example, a light $x_5$ in FIG. 6) passes through the light transmission part 2. On the other hand, a light which has an incident angle more than θ is reflected by the light reflection layer 3, wherein the light enters into any position.

FIG. 6 and the formula (1) show that θ<φ when $n_2<n_1$. Therefore, the incident angle of the light which passes through the light transmission part 2 can be narrowed. A light which passes through a transmission region in this way can definitely be guided to a microlens. The light can enter into a display panel as parallel rays which go in a direction which is perpendicular to a surface of an optical sheet B. Therefore, the light transmission part 2 is usually comprised of an air layer having a lower refractive index than a refractive index of the transparent substrate 103.

However, in a case of such an optical sheet B, the exiting light enters into a liquid crystal panel D as parallel rays. Therefore, utilization efficiency of the light 6 from the light source can be improved, and the distribution of the exiting light can be controlled, thereby a bright image display can be realized. On the other hand, this light goes in a direction which is perpendicular to a surface of the optical sheet B. Therefore, a bright image display can not be observed from an oblique direction. Therefore, there is a problem in that the view angle is limited.

Then, the object of the present invention is to provide an optical sheet, and a backlight unit and a display apparatus using the optical sheet. In the present invention, utilization efficiency of the light 6 from the light source can be improved, and the distribution of the exiting light can be controlled.

Further, the view angle of the display is broadened so that a bright image display can be observed from an oblique direction.

That is, the invention of Claim 1 is as follows: An optical sheet arranged in a back side of a display panel, said display panel displaying a screen display by controlling a light transmission or a light shading for a pixel unit, and a display light enters said display panel from said optical sheet, comprising: a lens sheet having a plurality of microlenses arranged on a front surface thereof and a plurality of projections located at a back side thereof, said projection being located between light transmission parts, and a part corresponding to said microlens being said light transmission part; and a plurality of light reflection layers provided on top parts of said plurality of projections, wherein said light transmission part is comprised of a material of which a refractive index is lower than a refractive index of said lens sheet, wherein a straight line connecting an inside corner of one of said light reflection films and an outside corner of another said light reflection film is located inside of a limit normal line, wherein a light source side of a center of said lens sheet is defined as inside and the opposite side is defined as outside, and wherein a normal line of a side surface of the projection, starting from said inside corner of said light reflection film among a pair of said light reflection films sandwiching said light transmission part is defined as a limit normal line, and wherein part of a light from said light source, said light exiting from said back side, is reflected by said light reflection layer while a light exiting from said light transmission part is refracted by said microlens so as to exit towards said display panel.

According to claim 1, there are a plurality of projections between the light transmission parts of the lens sheet. Therefore, part of the light entering into the light transmission part enters into the side surface of the projections. The light is refracted by this side surface of the projection, thereafter the light exits through the microlens. When the light refracted by the side surface of the projection exits through the microlens, the light exits in an oblique direction to a surface of the optical sheet. Therefore, the view angle of the display can be broadened.

In addition, as shown in FIG. 1 (a), in order to make a light which is refracted by the side surface of the projection 1 refract in a direction closer towards the center of the lens sheet, there is a need to satisfy a fixed relationship between the normal line of a side surface of the projection 1 and the entrance direction of the light which enters the side surface of projection 1.

That is, in FIG. 1 (a), a limit of a ray which enters into the side surface of the projection 1 when a light source 5 side of a center of a lens sheet is defined as an outside and the opposite side is defined as an inside, is a ray $x_1$ which is transmitted along a straight line between an inner corner 11 of a light reflection film 3 which is one of a pair of light reflection films 3 sandwiching a light transmission part 2, and an outer corner 10 of the other light reflection film. In a case where a normal line of the side surface of the projection 1, starting form the inside corner 11 of one of the light reflection films, is defined as a limit normal line 12, if the ray $x_1$ is on the inner side of the limit normal line 12 (that is, a center side of the lens sheet), a light refracted by the side surface of the projection 1 can be refracted in a direction closer towards a lens sheet side (that is, to the inside). On the other hand, as shown in FIG. 1 (b), in a case where the ray $x_1$ is on the outer side of the limit normal line 12 (that is, light source 5 side), the ray $x_1$ is refracted in a direction which is not as close to the inside of the lens sheet side.

In addition, the invention of claim 1 is the optical sheet, wherein a straight line between an inside corner of this light reflection film and an outside corner of the other light reflection film is on the inner side of the limit normal line, wherein a light source side of a center of a lens sheet is defined as outside and the opposite side is defined as inside, and wherein a normal line of the side surface of the projection, starting form the inside corner of one of the light reflection films, is defined as a limit normal line 12.

A straight line between an inside corner of a light reflection film which is one of a pair of light reflection films sandwiching a light transmission part and an outside corner of the other light reflection film is on the inside of the limit normal line. Therefore, a light refracted by the side surface of the projection is refracted in the direction closer to a lens sheet side wherein the amount of light refracted in the direction closer to a lens sheet side can be sufficiently provided, thereby the view angle of the display image can be broadened.

Next, an amount of the light refracted by the side surface of the projection can be controlled by the area of the side surface of the projection, that is, the height of the projection.

The invention of claim 2 is based on such a reason, and is the optical sheet according to claim 1, wherein the height of the projection is 1-100 µm.

In the invention of claim 2, the height of the projection is 1 µm or more. Therefore, the area of the side surface of the projection is sufficient. An amount of a light refracted by the side surface of the projection is sufficient, thereby the view angle of the display image can be broadened. In addition, in a case where the height of the projection is more than 100 µm, an amount of a light exiting in a direction which is perpendicular to a surface of the optical sheet is reduced. More preferably, it is 10-50 µm.

Next, the side surface of the projection can be planar or curved. The distribution of the exiting light can be controlled by changing the shape of the side surface of this projection. In a case of a planar side surface, an amount of light which exits in an oblique direction towards a (flat) surface of the optical sheet is increased, thereby the view angle can be improved. In addition, for example, in a case of a curved side surface like a convex, an amount of a light which exits in a direction which is perpendicular to a surface of the optical sheet is increased, thereby a displayed image observed from a front side of the display can be brightened.

The inventions of claim 3 and 4 are based on such a reason.

That is, the invention of claim 3 is the optical sheet according to claim 1, wherein the side surface of the projection is planar. The invention of claim 4 is the invention according to claim 1, wherein the side surface of the projection is curved. In addition, in a case where the side surface of the projection is curved, the shape of the curved surface can be spherical, cylindrical or ellipsoidal.

Next, a light reflected by the light reflection layer can be reflected by a reflection plate provided in a backlight unit so that the light is guided to the light transmission part. Then, the light guided to the light transmission part exits through the microlens, therefore the utilization efficiency of light from a light source can be raised. In this case, it is desirable that the light reflected by the reflection layer be deflected by a light scattering layer provided at this light reflection layer or on a light path of the light.

The inventions of claim 5 and 6 are based on such a reason. The invention of claim 5 is the optical sheet according to claim 1, wherein the light reflection layer is a light reflection layer which diffuses and reflects a light. On the other hand, the invention of claim 6 is the optical sheet according to claim 1, wherein a light scattering layer is formed so as to cover the light reflection layer and the light transmission part. In the inventions of claim 5 or 6, a light can be deflected by a light reflecting layer having a light reflection property to be guided to the light transmission part.

Next, in the invention of claim 7, an optical sheet and a light scattering layer are unified so that the handling of them becomes easy. That is, the invention of claim 8 is the invention according to claim 6, wherein a light scattering layer adheres to the light reflection layer.

An objective of the invention of claim 8 is to provide an optical sheet where a refractive angle α (See FIG. 1(*a*).) at the side surface of the projection 1 is reduced so that a light is refracted in a direction closer to a lens sheet side (a center side of a lens sheet). That is, the invention of claim 8 is the optical sheet according to claim 1, wherein the light transmission part between the light scattering layer and a lens sheet is comprised of a material having a refractive index which is lower than a refractive index of the lens sheet. In addition, the invention of claim 8 is the optical sheet according to claim 1, wherein the low refractive index material is air.

Next, the invention of claim 9 is related to a backlight unit having the optical sheet according to claim 1.

That is, the invention of claim 9 is as follows:

a backlight unit is placed in a back side of a display panel, the display panel shows an image by controlling shading or transmission of a light for a pixel unit, and a display light enters this display panel from the back light; the backlight unit has a light source, a light reflection plate arranged in a back side of this light source, and an optical sheet arranged between a light source and a display panel; the optical sheet comprises a plurality of microlenses arranged on a surface of the optical sheet, a light transmission part on the back surface of the optical sheet, the light transmission part including an intersection of a perpendicular line drawn from a top part of the microlens to the other surface of the light transmission part and a side surface of a projection described below, a lens sheet having a plurality of projections adjacent to these light transmission parts, and a plurality of light reflection layers provided on the top part of the plurality of projections. Part of a light from a light source, the light exiting from the back surface is reflected by the light reflection layer while an incident light exiting from the light transmission part is refracted by the microlens to enter the display panel.

In addition, the invention of claim 10 is related to a display apparatus having this backlight unit.

That is, the invention of claim 10 is as follows:

an display apparatus has a display panel and a backlight unit, wherein the display panel displays an image by controlling shading or transmitting of a light for pixel unit, and the backlight unit is arranged in a back side of this display panel to irradiate this display panel with a display light; the backlight unit has a light source, a light reflection plate arranged in a back side of this light source, and an optical sheet arranged between a light source and a display panel; the optical sheet comprises a plurality of microlenses arranged on a surface of the optical sheet, a light transmission part on the back surface of the optical sheet, the light transmission part including an intersection of a perpendicular line drawn from a top part of the microlens to the other surface of the light transmission part and a side surface of a projection described below, a lens sheet having a plurality of projections adjacent to these light transmission parts, and a plurality of light reflection layers provided on the top part of the plurality of projections. Part of a light from a light source, the light exiting from the back surface is reflected by the light reflection layer while an incident light exiting from the light transmission part is refracted by the microlens to enter the display panel.

The following is another embodiment of the present invention: an optical sheet is placed in a back side of a display panel, the optical sheet showing an image by controlling shading or transmission of a light for a pixel unit, and a display light enters this display panel from the optical sheet. The optical sheet comprises a plurality of microlenses arranged on a surface of the optical sheet, a light transmission part on the back surface of the optical sheet, the light transmission part including an intersection of a perpendicular line drawn from a top part of the microlens to the other surface of the light transmission part and a side surface of a projection described below, a lens sheet having a plurality of projections adjacent to these light transmission parts, and a plurality of light reflection layers provided on the top part of the plurality of projections. Part of a light from a light source, the light exiting from the back surface is reflected by the light reflection layer while an incident light exiting from the light transmission part is refracted by the microlens to enter the display panel.

In these drawings, 1 is a projection; 2 is a light transmission part; 3 is a light reflection part; 4 is a light scattering part; 5 is a light source; 6 is a light of a light source; 7 is a light reflection plate; 8 is an exiting light; 9 is a liquid crystal layer; 10 is an outside corner part; 11 is an inside corner part; 12 is a limit normal line; 13 is a refracting light; 100 is a microlens; 101 is a width of an aperture; 102 is a thickness of a light reflection layer; 103 is a transparent substrate; A is a lens sheet; B is an optical sheet; C is a backlight unit; and D is a liquid crystal panel.

DESCRIPTION OF THE PREFERRED EMBODIMENTS

Figure 1:
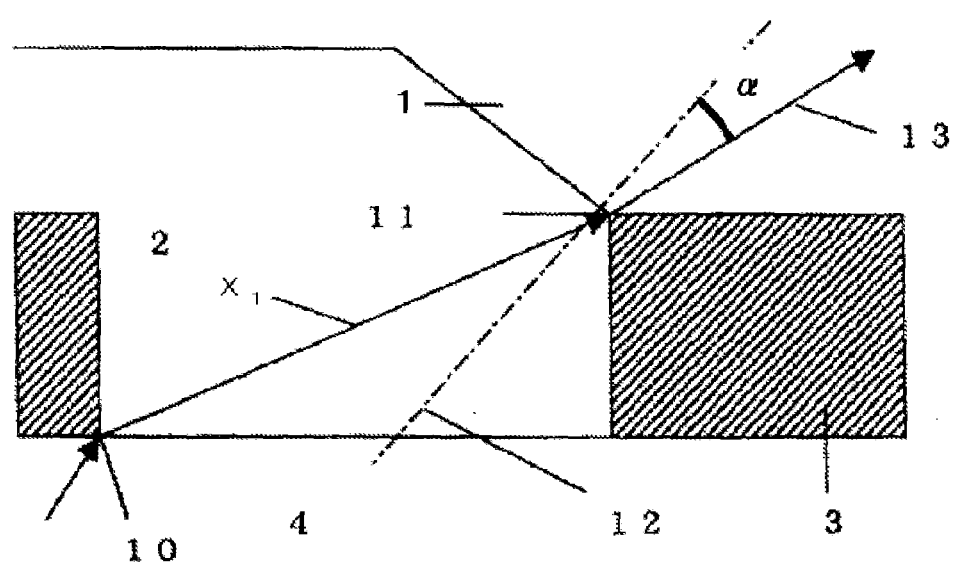
FIGS. 1 (*a*) and (*b*) are exemplary diagrams showing a fundamental principle of an optical sheet of the present invention.
Figure 1:
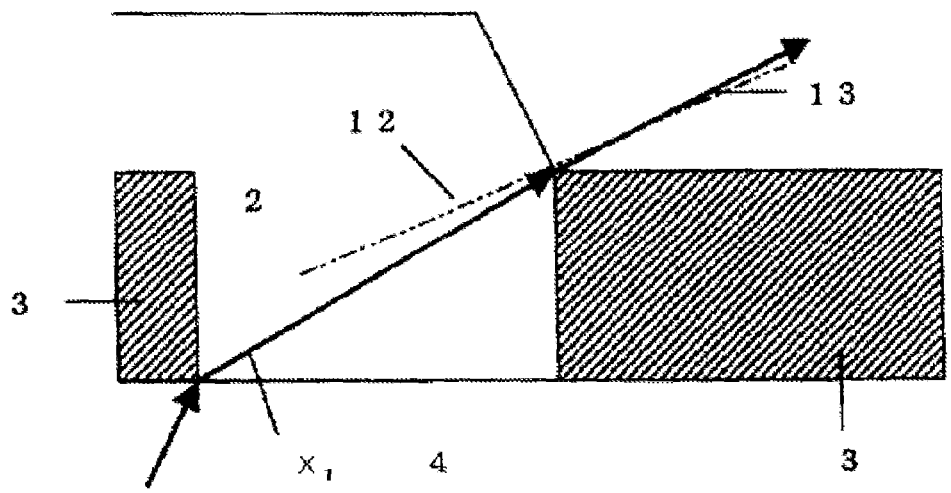
Figure 2:
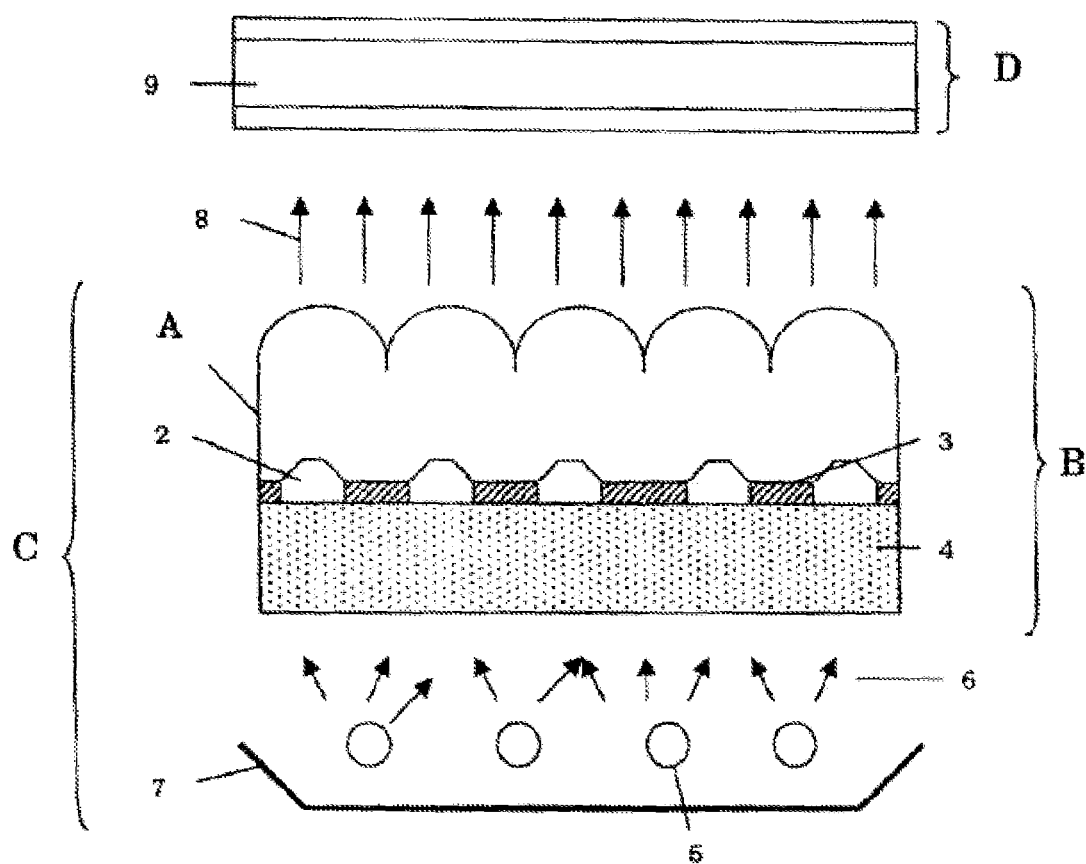
FIG. 2 is an exemplary diagram showing a liquid crystal display related to an embodiment of the present invention.

An optical sheet of the present invention is arranged in a back side of a display panel, wherein the light from the optical sheet enters into this display panel. This optical sheet is used as a part of a backlight unit. FIG. 2 shows a display apparatus, wherein a backlight unit is arranged in a back side of a display panel.

The display panel has a plurality of sectioned pixels, wherein a screen is displayed by the contrast between a light transmission part and a shaded part where the light transmission or shading is controlled for these pixel units.

The backlight unit has a light source, a light reflection plate arranged in back side of the light source, and an optical sheet arranged between the light source and the display panel. The light reflection plate is used for improving the utilization efficiency of a light from a light source by reflecting the light from the light source in the direction of the optical sheet. In addition, the optical sheet makes the luminance of the source light uniform within the display surface, while an amount of light entering into the display panel is increased to improve the utilization efficiency of a light. In addition, the display light enters in both directions, wherein one direction is perpendicular to the display panel and the other direction is an oblique direction towards the display panel. Thereby, the brightness of the display screen is improved and the view angle is increased.

The optical sheet has a lens sheet, a light reflection layer provided on a part of this lens sheet, as necessary elements. It is desirable that the optical sheet has a light scattering layer covering the light reflection layer and the light transmission part, besides the necessary elements. It is desirable that this light reflection layer be attached to the light scattering layer. In a case where the light reflection layer is attached to the light scattering layer, the lens sheet and the light scattering layer can be conveniently handled as a unified element. An example shown in the figure is an example of an optical sheet where a light scattering layer is attached to a light reflection layer.

In the figure, a light emitted from a light source 5 is first scattered uniformly. A light exiting towards the light transmission part 2 among the scattered light passes through this light transmission part 2. Thereafter, the light is refracted by the microlens. The refracted light exits from the optical sheet B towards the display panel. In addition, the scattered light exiting towards a part except for the light transmission part 2 is reflected by the light reflection plate or the light reflection layer 3. Finally, by repeating the reflection, the light passes through the light transmission part 2. Further, the light is refracted by the microlens and exits from the optical sheet B towards the display panel. In this way, all of the light 6 from a light source passes through the light transmission region and the microlens and exits from the optical sheet B. Thereafter, the light enters into the display panel.

Figure 3:
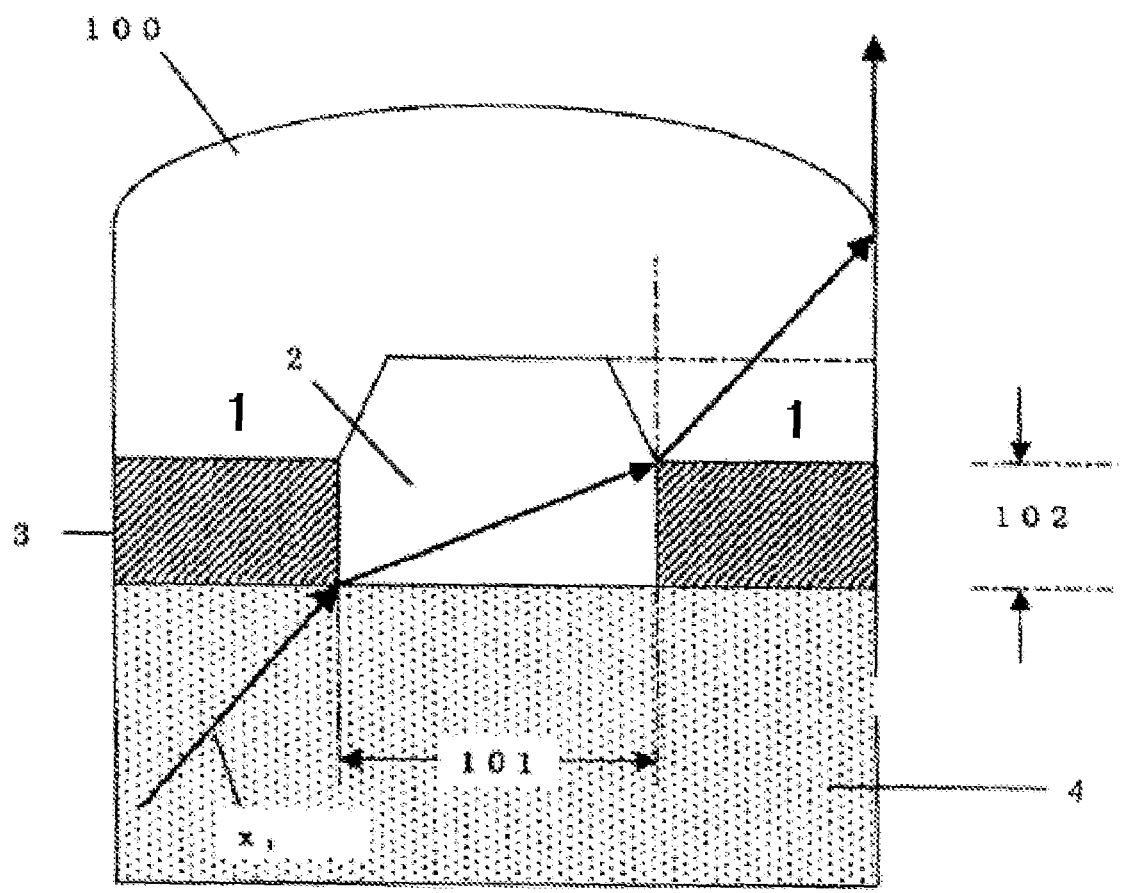
FIG. 3 is an enlarged cross-sectional view of a main part of an optical sheet of an embodiment of the present invention.

Next, the optical sheet is described. FIG. 3 is an enlarged cross-sectional view of a part of the optical sheet B. In the figure, in a lens sheet, a plurality of microlenses are arranged on the surface of the optical sheet in the display panel side. A half-column shaped cylindrical lens can be preferably used for the microlens 100. In one embodiment, these cylindrical lenses are arranged without a gap. A spherical lens can be used for the microlens 100. In addition, an example of the figure shows a half-column shaped cylindrical lens.

The lens sheet has a plurality of projections on a part of the back side surface of the lens sheet. The light reflection layer 3 is provided on the top part of this projection 1.

That is, in the lens sheet B, the light transmission part 2 is located at a position near the focus position of the microlens 100. A plurality of projections 1 are provided between these light transmission parts 2, while the light reflection layer 3 is provided on the top part of this projection 1. Thereby, a light exiting from a part except for the light transmission part 2 near the focus position is prevented. Therefore, the light 6 from the light source enters into the inside of the lens sheet only from the light transmission part 2. The light does not enter into the inside of the lens sheet from the other parts.

The light transmission parts 2 are respectively provided corresponding to the microlenses 100, at a ration of one on one. Therefore, the number of the microlenses 100 is the same as the number of the light transmission parts 2. In addition, the pitch of the microlenses 100 is same as the pitch of the light transmission parts 2.

In addition, the projection 1 is provided between the light transmission parts 2. The top part of the projection 1 is flat. Since the reflection layer 3 is provided on the top part of the projection 1, the number of the light reflection layers 3 is the same as the number of the microlenses 100. The pitch of the light reflection layers is the same as the pitch of the microlenses.

In the example shown in the figure, since a half-column shaped cylindrical lens is used as a microlens 100, the light transmission part 2 is stripe-shaped corresponding to the microlens 100. In addition, the light reflection part 3 is stripe-shaped.

The pitch of the microlens 100 is determined according to a display apparatus to which this optical sheet B is applied. Generally, the pitch is 50-200 μm. In a case where the pitch of the microlens is less than 50 μm, it is difficult to make the projection. In a case where the pitch of the microlens is more than 200 μm, unevenness in luminance in a display screen may occur.

It is desirable that the light transmission part 2 be located at a position near a focus position of the microlens 100. In this case, a light entering into a lens sheet from the light transmission part 2 is refracted by the microlens 100, thereafter the light exits, as a parallel light, in a direction which is perpendicular to a surface (a plane) of the optical sheet B. Thereafter, this light perpendicularly enters into a back surface of the display panel. Next, the light exits a front side of the display screen from the display screen. Therefore, in a case where the light transmission part 2 is located at a position near a focus position of the microlens 100, all of the light entering into the lens sheet from the light transmission part 2 is collected in the front side of the display screen. Thereby, the display screen observed from the front side is bright.

On the other hand, in a case where the light transmission part 2 is located at a position which is in the microlens side of the focus position of the microlens 100, or is located at a position which is in the backlight unit side of the focus position of the microlens 100, a component of light which exits in an oblique direction from the front surface of the display screen is generated.

In addition, when the area of the light transmission part 2 becomes large, a component of light which exits in an oblique direction towards a surface (a plane) of the optical sheet B, and a part of the light does not enter into the display screen. Therefore, it is desirable that the aperture width 101 of the light transmission part 2 be 30-60% of the pitch of the cylindrical lens. For example, in a case where the pitch of the cylindrical lens is 200 μm, the aperture width 101 of the light transmission part 2 is 60-120 μm. In addition, in a case where the pitch of the cylindrical lens is less than 100 μm, it is desirable that the aperture width 101 of the light transmission part 2 be 40-70%. For example, in a case where the pitch of the cylindrical lens is 50 μm, the aperture width 101 of the light transmission part 2 is 20-35 μm. In a case where the size of the aperture width 101 of the light transmission part 2 is narrower than this size, an amount of light entering into the lens sheet from this light transmission part 2 is decreased, thereby it becomes difficult to obtain a bright screen display. On the other hand, in a case where the size of the aperture width 101 of the light transmission part 2 is broader than this size, a component of light which does not enter into the display screen is increased, thereby the light 6 from the light source is not effectively used.

Next, the light reflection layer 3 is an element which prevents a light from entering into the lens sheet from a part except for the light transmission part 2. That is, the light reflection layer 3 reflects light. Therefore, the total of the width of the light reflection layer 3 and the aperture width 101 of the light transmission part 2 is equal to the pitch of the cylindrical lens. For example, in a case where the pitch of the cylindrical lens is 200 μm, the width of the light reflection layer 3 is 140-80 μm. In a case where the pitch of the cylindrical lens is 50 μm, the width of the light reflection layer 3 is 30-15 μm.

In addition, it is found, from FIG. 3, that the thickness of the light reflection layer 3 and the aperture width 101 of the light transmission part 101 limit a direction in which a light enters into the microlens 100. The limit of the direction in which the light comes into the microlens 100 is a light shown by $x_1$ in the figure. The direction in which the light enters into the microlens 100 is controlled, thereby an amount of light going to a front side of the display screen and an amount of light going to the oblique direction are properly divided. Therefore, it is desirable that the thickness 102 of the light reflection layer be 2-20% of the aperture width 101 of the light transmission part 2. However, when the thickness of the light reflection layer 3 is thin, the light reflection performance is reduced. Therefore, the lower limit of the thickness is 2 μm.

Further, it is necessary for this light reflection layer 3 to be provided on the top part of the projection 1. This projection, as shown in the figure, is an element which refracts a light to the following direction by using the slope of the side surface of the projection 1: the light is refracted in the direction of the microlens side wherein the direction is the oblique direction towards a surface (a plane) of the optical sheet B. Therefore, it is necessary for the side surface of the projection to be a slope. That is, it is necessary for this projection 1 to be a projection having a cross-section of a trapezoid where the area of the flat top part is smaller than the area of the base bottom part.

In addition, as mentioned-above, it is desirable that a straight line connecting the inside corner 11 of this light reflection film and the outside corner 10 of the other light reflection film be located inside of the limit normal line 12 so that a light is refracted by the side surface of the projection 1 in the direction closer to the lens sheet side (a direction of a center of the lens sheet), wherein the light source 5 side of the center of the lens sheet is defined as outside and the opposite side is defined as inside, and wherein a normal line of the side surface of the projection 1, starting from the inside corner of one light reflection film among a pair of light reflection films sandwiching the light transmission part 2 is defined as a limit normal line 12.

In addition, an amount of light entering into the side surface of the projection 1 changes according to the area of the side surface, that is, the height of the side surface. Therefore, it is desirable that the height of the projection 1 be 1-100 μm. In a case where the height of the projection is 1 μm or more, the area of the side surface of the projection 1 can be sufficiently provided, thereby an amount of light which enters into the side surface of this projection and is refracted, is sufficiently provided. Therefore, the view angle of the display screen can be broadened. In addition, in a case where the height of the projection 1 is more than 100 μm, an amount of light which exits in a direction that is perpendicular to a surface (a plane) of the optical sheet B is decreased. More preferably, it is 10-50 μm.

Next, the side surface of the projection 1 can be planar or can be curved. In the example shown in FIG. 3, the side surface of the projection 1 is planar. In this case, a light entering into the side surface of the projection 1 from an identical direction is refracted in an identical direction. Therefore, an amount of light exiting in an oblique direction towards a surface (a plane) of the optical sheet B is increased. Thereby, the view angle can be improved.

Figure 4:
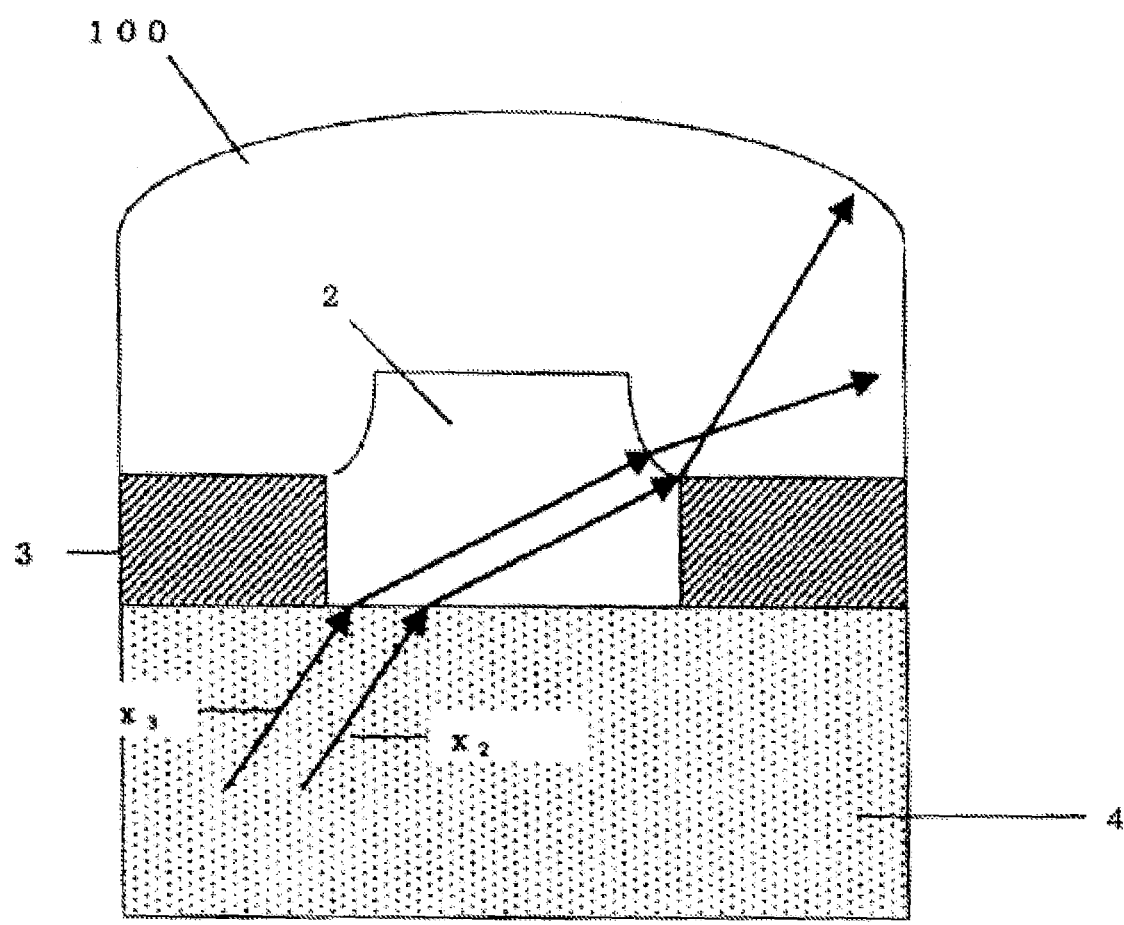
FIG. 4 is an enlarged cross-sectional view of a main part of an optical sheet of another example of the present invention.
Figure 5:
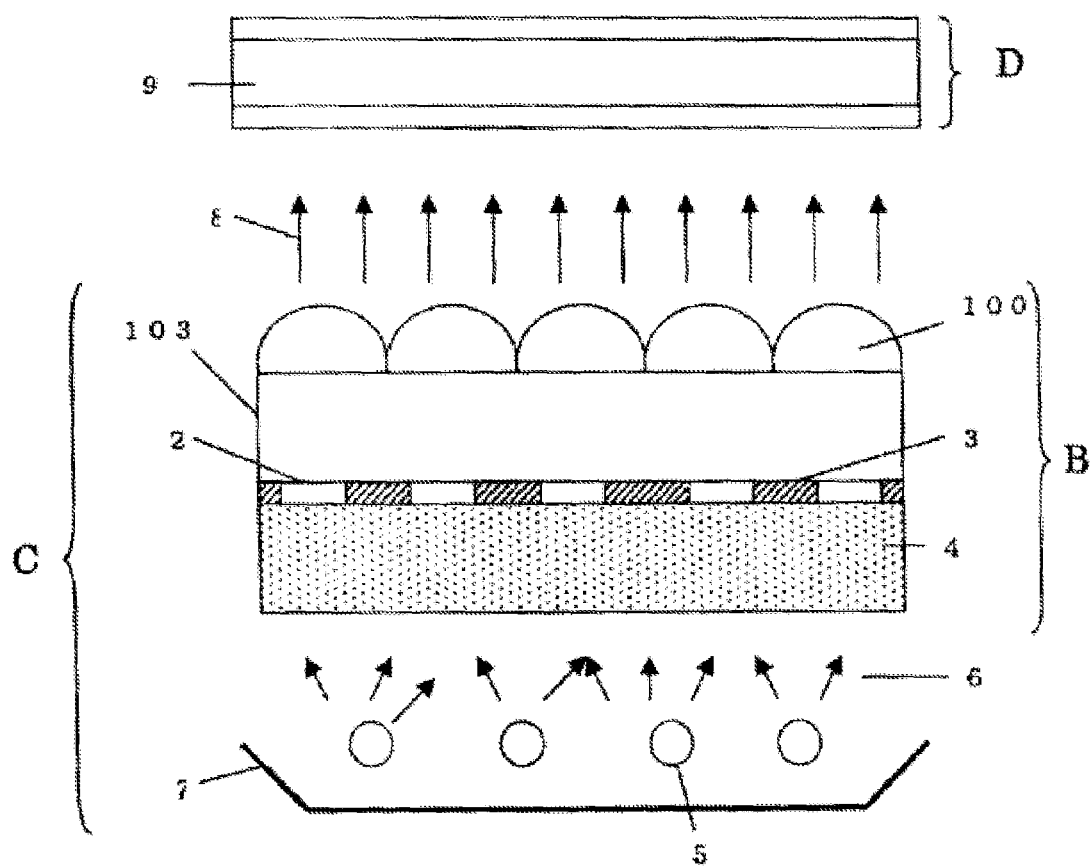
FIG. 5 is an exemplary diagram showing a conventional liquid crystal display.
Figure 6:
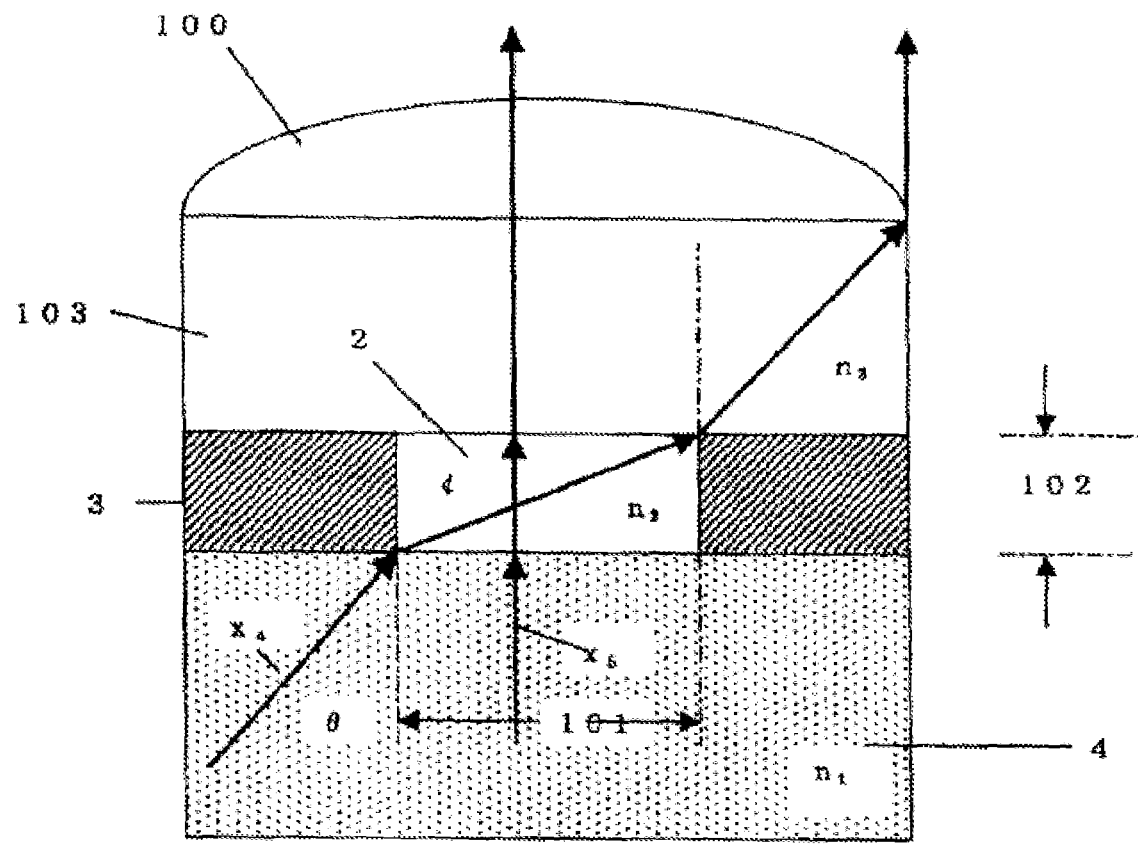
FIG. 6 is an exemplary diagram showing a fundamental principle of a conventional optical sheet.

On the other hand, in the example shown in FIG. 4, the side surface of the projection 1 is curved. In the example of the figure, the side surface of the projection 1 is cylindrical column-shaped, wherein a convex of the curved surface is facing the light transmission part 2. In this case, for example, in the figure, a light entering into the side surface near the top part of the projection such as a light shown by $x_2$ is refracted in the direction of the lens sheet. On the other hand, in the figure, a light entering into the side surface near the base bottom part of the projection 1 such as a light shown by $x_3$ is refracted in a direction towards the light source side, even if the incident directions of $x_2$ and $x_3$ are identical. Therefore, in a case where the side surface of the projection is curved like a convex, the view angle can be broadened. In addition, the shape of the side surface of the projection 1 is not limited to the cylindrical column-shape, and can be spherical or ellipsoidal. In addition, part of the side surface of the projection 1 can be curved while the other part of the side surface of the projection 1 is planar. For example, part of the side surface of the projection 1 near the inside corner 11 of the light reflection film can be curved while the other part is planar.

Next, it is desirable that the light transmission part 2 be comprised of a material of which a refractive index is lower than a refractive index of the lens sheet. As shown in the figure, it is because a light refracted by the side surface of the projection 1 is refracted in the direction of the lens sheet in a case where the light transmission part 2 is comprised of a material of which the refractive index is lower than a refractive index of the lens sheet. An example of such a material is air. In a case of air, the light transmission part 2 having a lower refractive index can be formed compared with other low refractive index materials. In one embodiment, a space surrounded by the light scattering layer 4, the lens sheet and the light reflection layer 3 is an air layer.

Next, a material for each member which constitutes an optical sheet B is described. A method for manufacturing an optical sheet B is also described.

A lens sheet can be manufactured using a transparent resin. For example, the lens sheet can be manufactured by trimming both surfaces of a transparent synthetic resin sheet. In addition, the lens sheet can be molded by injecting a thermoplastic resin into a metal mold having a proper shape. In addition, a synthetic resin film may be arranged inside a metal mold having a proper shape, thereafter a thermoplastic resin may be injected on both sides of the film to manufacture a microlens 100 and a projection 1. In addition, a metal mold may be put on a thermoplastic resin sheet, and, in this state, these elements may be heated and pressed to manufacture a molded single body including a transparent substrate 103 and a microlens 100.

In addition, in a case where a microlens 100 is a cylindrical lens, a lens sheet can be manufactured by an extrusion molding method using a metal mold having a proper shape. In addition, after a sheet-shaped thermoplastic resin has been formed by an extrusion molding method, the resin can be changed into a cylindrical lens shape by being pressed by a metal mold while the resin still has a plastic property. In this case, it is desirable that pressing by a metal mold be performed immediately after molding a thermoplastic resin by an extrusion molding method.

In addition, in a case where a microlens 100 is a cylindrical lens, for example, a cylindrical lens and projection 1 can be formed by the following process: a synthetic resin film is used as a substrate film; and a thermoplastic resin is formed on both sides of this substrate film by a melting extrusion coating. In addition, after a thermoplastic resin has been formed on both sides of a substrate film by a melting extrusion coating, the shape of these elements can be changed by being pressed by a metal mold while the resin still has a plastic property. In this case, it is desirable that these elements be pressed by a metal mold immediately after a thermoplastic resin is formed by a melting extrusion coating.

Polyethylene terephthalate, polyethylene, polypropylene, polycarbonate, polymethyl methacrylate and the like can be used for a material of a lens sheet. In addition, in a case where a synthetic resin film is used as a substrate film, polyethylene terephthalate film, polyethylene film, polypropylene film, a polycarbonate film, polymethyl methacrylate film and the like can be used for this substrate film.

Next, in a light reflection layer 3, it is necessary for light to be shaded and to be reflected. In addition, the thickness of the light reflection layer 3 and the width 101 of the aperture limit the incident angle of a ray of light and limit the spread of the exiting light from the microlens 100. For these reasons, it is desirable that the thickness of the light reflection layer be 2 μm or more and that the thickness be 2-20% of the aperture width of the light transmission part.

A coated film which has a high refractive index particle diffused in a resin can be used for such a light reflection layer 3. $TiO_2$ particle, $SiO_2$ particle, MgO particle, $BaSO_4$ particle, $CaCO_3$ particle and $Al_2O_3$ particle can be used for the high refractive index particle. A mixture of a particle having an average particle diameter of 0.1 μm or more and less than 0.2 μm, and another particle having an average particle diameter of 0.2 μm or more and 0.3 μm or less is preferred. As is commonly known, the wave length of the visible light is about 0.4-0.7 μm. Light scattering occurs most effectively by a particle having an average particle diameter of half of the wave length. Therefore, all rays of a visible light can be highly reflected by using these two kinds of particles. In addition, it is desirable that the content of the particle included in the light reflection layer 3 be 50 vol. % or more in order to keep a sufficiently high reflectance. In addition, the upper limit of the content of the particle is determined according to the condition where the light reflection layer 3 can be formed as a film. Generally, the content is 90 vol. % or less.

In addition, a coated film which has a metal particle having a light reflection property diffused in a resin can be used. For example, Al particle and Ag particle can be used for the metal particle. The metal particle having an average particle diameter of 0.2 μm or more is preferred. The upper limit of the average particle diameter should not give a harmful effect to the forming of the coated film.

In addition, for example, acryl resin, polyurethane resin, polyester resin, polyamide resin, silicone resin, epoxy resin, polycarbonate resin, cyclo-olefin resin, polyethylene and ethylene vinyl acetate copolymer can be used for the resin of the light reflection layer. Modified compounds or derivatives thereof can be used.

The light reflection layer 3, for example, can be formed by the following processes: a coating liquid or an ink is prepared by dissolving the resin and the particles in a solvent; and the coating liquid or the ink is applied to or printed to the top part of the projection 1. In addition, the light reflection layer 3 can be selectively formed on the top part: a transfer foil is manufactured by applying a coating liquid on a temporary supporting body; and this transfer foil is put on the top part of the projection 1 to perform a transfer process. In whichever case, since the top part of the projection 1 is projected compared with the surroundings, the light reflection layer 3 can be precisely formed on the top part of this projection.

Next, a light scattering layer 3 has a transparent resin and a transparent particle dispersed in this transparent resin, wherein a refractive index of the transparent resin is necessary to be different from a refractive index of the transparent particle. It is desirable that a difference in the refractive index between the transparent resin and the transparent particle be 0.02 or more. In a case where the difference is less than 0.02, a sufficient light scattering performance can not be obtained. In addition, the difference of 0.5 or less is preferred.

The light scattering layer 4 is different from the light reflection layer 3. That is, in the light scattering layer 4, it is necessary for the light incident towards the light scattering layer to be scattered and transmitted. Therefore, it is desirable that the light scattering performance of the transparent particle included in the light scattering layer 4 be less than the light scattering performance of the high refractive index particle included in the light reflection layer 3. Therefore, it is desirable that the average particle diameter of the transparent particle be 0.5-10.0 μm. More preferably, it is 1.0-5.0 μm.

For example, polycarbonate resin, acrylic resin, fluorine system acryl resin, silicone system acryl resin, epoxy acrylate resin and fluorene resin can be used for the transparent resin of the light scattering layer 3.

In addition, a transparent particle comprised of an inorganic oxide and a transparent particle comprised of a resin can be used for the transparent particle of the light scattering layer 3. Examples of the transparent particle comprised of the inorganic oxide include particles such as silica and alumina. In addition, the transparent particle comprised of the resin include acryl particle, styrene acryl particle, cross-link form thereof; particle of melamine-formalin condensate; fluorinated polymer particles such as PTFE (polytetrafluoroethylene), PFA (perfluoro alkoxy resin), FEP (tetrafluoroethylene-hexafluoropropylene copolymer), PVDF (polyfluoro vinylidene), and ETFE (ethylene-tetrafluoroethylene copolymer), and silicone resin particle.

Next, the transparent particle is dispersed in the transparent resin, thereafter a plate-shaped light scattering layer 3 can be manufactured by an extrusion molding method.

Next, this light scattering layer 3 can be attached to the light reflection layer 33 using an adhesive. An adhesive can be applied to a light scattering layer 3, thereafter a lens sheet can be attached to the light scattering layer 3 by pressing the lens sheet. However, it is desirable that an adhesive be applied to a light reflection layer 3 of a lens sheet, thereafter a light scattering layer 4 is attached to the lens sheet by pressing the light scattering sheet. In this case, an adhesive does not exist on a light path of a light 6 of a light source, thereby a high quality optical sheet B can be manufactured while a light reflection or a light absorption by an adhesive can be avoided.

In invention of claim 1, there are a plurality of projections between the light transmission parts of the lens sheet. Therefore, a light entering into the side surface of this projection is refracted by the side surface of the projection. So, the light exits in an oblique direction towards a surface (a plane) of the optical sheet. Therefore, the view angle of the display screen can be broadened to provide a bright display.

A straight line which connects the inside corner of one light reflection film among a pair of light reflection films sandwiching a light transmission part, and the outside corner of the other light reflection film is located on the inside of the limit normal line. Therefore, an amount of light refracted in the direction of a lens sheet side wherein the light enters into the side surface of the projection is sufficiently provided. Therefore, the view angle of the display screen can be broadened.

In the invention of claim 2, the height of the projection is 1 μm or more. Therefore, the area of the side surface of the projection is sufficiently provided. So, an amount of light which enters into the side surface of the projection and is refracted, is sufficiently provided, thereby the view angle of a display screen can be broadened.

In the invention of claim 3, the side surface of the projection is planar. Therefore, an amount of light which exits in an oblique direction towards a surface (a plane) of the optical sheet is increased, thereby the view angle can be improved.

In the invention of claim 4, the side surface of the projection is curved, thereby the distribution of the exiting light can be controlled. For example, in a case of a curved side surface like a convex, an amount of a light which exits in a direction which is perpendicular to a surface (a plane) of the optical sheet is increased, thereby a displayed image observed from a front side of the display can be brightened.

In the invention of claim 5, the light reflection layer is a light reflection layer which diffuses and reflects a light. On the other hand, in the invention of claim 6, a light scattering layer is provided so as to cover the light reflection layer and the light transmission part, therefore a light can be deflected by a light reflecting layer having a light reflecting property to be guided to the light transmission part.

In the invention of claim 7, a light scattering layer is attached to the light reflection layer, thereby the handling of the unified elements becomes easy.

Next, in the invention of claim 8, a space between a light scattering layer and a lens sheet is comprised of a material of which a refractive index is lower than a refractive index of this lens sheet. In addition, in the invention of claim 8, the low refractive index material is air. Therefore, the refractive angle at the side surface of the projection can be decreased, thereby the light is refracted in a direction towards a lens sheet side (a center side of a lens sheet). The view angle can be improved while a bright screen display can be realized.

Next, the invention of claim 9 is a backlight unit having the optical sheet according to claim 1. The invention of claim 10 is a display apparatus having this backlight unit. Therefore, the view angle of the display can be broadened to obtain a bright screen display.

What is claimed is:

1. An optical sheet arranged in a back side of a display panel, said display panel displaying a screen display by controlling a light transmission or a light shading for a pixel unit, and a display light enters said display panel from said optical sheet, comprising:
    a lens sheet having a plurality of microlenses arranged on a front surface thereof and a plurality of projections located at a back side thereof, said projection being located between light transmission parts, and a part corresponding to said microlens being said light transmission part; and
    a plurality of light reflection layers provided on top of said plurality of projections,
    wherein said light transmission part is comprised of a material of which a refractive index is lower than a refractive index of said lens sheet,
    wherein a straight line connecting an inside corner of one of said light reflection layers and an outside corner of another said light reflection layer is located inside of a limit normal line, wherein a light source side of a center of said lens sheet is defined as inside and the opposite side is defined as outside, and wherein a normal line of a side surface of the projection, starting from said inside corner of said light reflection layer among a pair of said light reflection layers sandwiching said light transmission part is defined as a limit normal line,
    and wherein part of a light from a light source, said light exiting from said back side, is reflected by said light reflection layer while a light exiting from said light transmission part is refracted by said microlens so as to exit towards said display panel.

2. The optical sheet according to claim 1,
    wherein a height of said projection is 1-100 μm.
3. The optical sheet according to claim 1,
    wherein said side surface of said projection is planar.
4. The optical sheet according to claim 1,
    wherein said side surface of said projection is curved.
5. The optical sheet according to claim 1,
    wherein said light reflection layer is a light reflection layer which diffuses and reflects a light.
6. The optical sheet according to claim 1,
    wherein a light scattering layer is provided so as to cover said light reflection layer and said light transmission part.
7. The optical sheet according to claim 6,
    wherein said light scattering layer is attached to said light reflection layer.
8. The optical sheet according to claim 1,
    wherein said material having said lower refractive index is air.
9. A backlight unit arranged in a back side of a display panel, said display panel displaying a screen display by controlling a light transmission or a light shading for a pixel unit, comprising:
    a light source;
    a light reflection plate arranged in a back side of said light source; and
    an optical sheet arranged between said light source and said display panel,
    wherein said optical sheet comprises
    a lens sheet having a plurality of microlenses arranged on a front surface thereof and a plurality of projections located at a back side thereof, said projection being located between light transmission parts, and a part corresponding to said microlens being said light transmission part; and
    a plurality of light reflection layers provided on top of said plurality of projections,
    wherein said light transmission part is comprised of a material of which a refractive index is lower than a refractive index of said lens sheet,
    wherein a straight line connecting an inside corner of one of said light reflection layers and an outside corner of another said light reflection layer is located inside of a limit normal line, wherein a light source side of a center of the lens sheet is defined as outside and the opposite side is defined as inside,
    and wherein a normal line of a side surface of said projection, starting from said inside corner of said light reflection layer among a pair of said light reflection layers sandwiching said light transmission part is defined as a limit normal line,
    and wherein part of a light, said light exiting from said back side, is reflected by said light reflection layer while a light exiting from said light transmission part is refracted by said microlens so as to enter said display panel.

10. A display apparatus comprising a display panel, said display panel displaying a screen display by controlling a light transmission or a light shading for a pixel unit and a backlight unit arranged in a back side of said display panel irradiates said display panel with a display light,
    wherein said backlight unit comprises a light source, a light reflection plate arranged in a back side of said light source, and an optical sheet arranged between said light source and said display panel, wherein said optical sheet comprises
a lens sheet having a plurality of microlenses arranged on a front surface thereof and a plurality of projections located at a back side thereof, said projection being located between light transmission parts, and a part corresponding to said microlens being said light transmission part; and
a plurality of light reflection layers provided on top of said plurality of projections,
wherein said light transmission part is comprised of a material of which a refractive index is lower than a refractive index of said lens sheet, wherein a straight line connecting an inside corner of one of said light reflection layers and an outside corner of another said light reflection layer is located inside of a limit normal line, wherein a light source side of a center of said lens sheet is defined as outside and the opposite side is defined as inside, and wherein a normal line of a side surface of said projection, starting from said inside corner of said light reflection layer among a pair of said light reflection layers sandwiching said light transmission part is defined as a limit normal line, and wherein part of a light, said light exiting from said back side, is reflected by said light reflection layer while a light exiting from said light transmission part is refracted by said microlens so as to enter said display panel.

* * * * *